United States Patent

Reed et al.

[11] 4,208,454
[45] Jun. 17, 1980

[54] METHOD FOR COATING CATALYST SUPPORTS

[75] Inventors: James R. Reed; Terrance Way; Richard A. Leal, all of Flint, Mich.

[73] Assignee: General Motors Corporation, Detroit, Mich.

[21] Appl. No.: 870,615

[22] Filed: Jan. 19, 1978

[51] Int. Cl.² .............................................. B05D 7/22
[52] U.S. Cl. ...................................... 427/238; 118/50; 427/243; 427/443.2
[58] Field of Search ............... 427/243, 294, 238, 350, 427/430 B; 118/50, 50.1; 252/466 PT, 477 R

[56] References Cited
U.S. PATENT DOCUMENTS

| | | | |
|---|---|---|---|
| 2,612,443 | 9/1952 | Goetzel et al. | 118/50 X |
| 2,867,544 | 1/1959 | Hall, Jr. | 427/294 X |
| 3,022,187 | 2/1962 | Eyraud et al. | 118/50 |
| 3,948,213 | 4/1976 | Hoyer et al. | 118/50 |

Primary Examiner—Evan K. Lawrence
Attorney, Agent, or Firm—Sidney Carter

[57] ABSTRACT

A method for controlling the coating with alumina of ceramic monolithic catalyst supports on a production basis to achieve repeatability of coating utilizing a vacuum system to distribute a coating slurry of alumina over the interior surfaces of and purge the excess coating slurry from the support at the same time that plugged tubular passageways through the support are unplugged, comprising the steps of applying the coating slurry to the support which has at least about 100 axially aligned tubular passageways to the square inch and subjecting the support to a vacuum to draw the slurry through the passageways and remove plugging and excess slurry to form a coating of alumina on the passageway surfaces. The support is dried and calcined to fix the alumina coating on the passageway surfaces.

5 Claims, 3 Drawing Figures

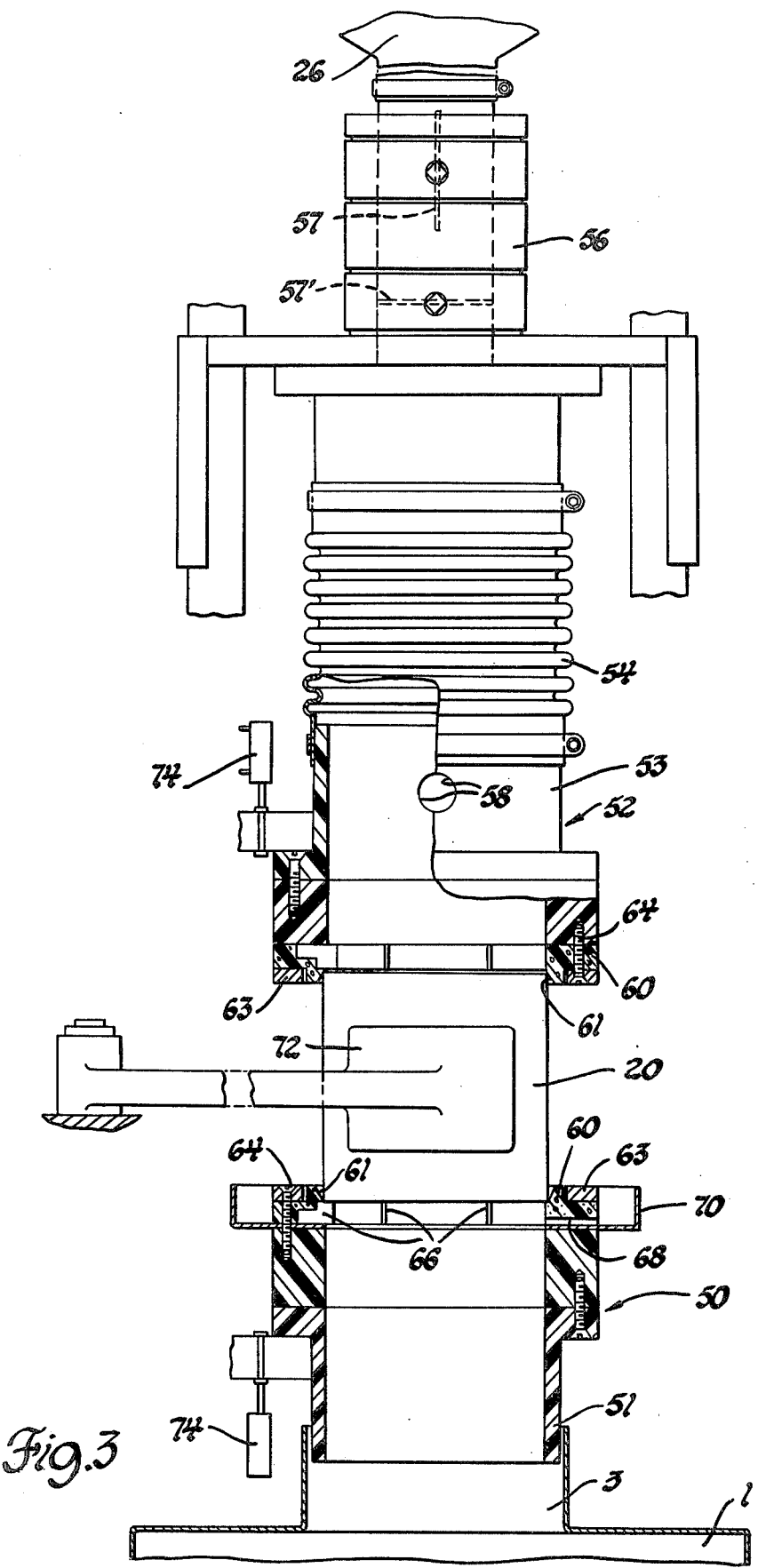

METHOD FOR COATING CATALYST SUPPORTS

BACKGROUND OF THE INVENTION

The catalytic conversion of the noxious components in vehicular exhaust gases is in current use for overcoming air pollution. The catalysts for the various forms of converters are, at this time, being manufactured and supplied in two general forms, namely: (1) as catalyst coated rigid skeletal monoliths, honeycomb type of elements, where there are a multiplicity of longitudinal passageways in each unit in order to provide a high surface area; and (2) as confined masses or beds of catalyst coated pellets which may be generally of spherical or cylindrical form with diameters and lengths of about ⅛ inch.

The present invention relates to ceramic monolithic catalyst support and more particularly, to an improved method for treating the catalyst support in a controlled manner to effect a high surface area coating thereon which is reproducible between supports, using apparatus adapted to mass production requirements. It is essential from the standpoint of costs and attainment of the desired level of catalyst performance in a production process of the type herein described to be able to closely control the coating operation for repeatable results between succeeding supports, in order to minimize the amount of coating applied, especially where the catalytically active material, e.g., platinum, palladium, rhodium, is codeposited with the high surface area material.

The rigid monolithic, honeycomb structures are typically made from ceramics which comprise refractory crystalline materials such as sillimanite, magnesium silicates, zircon, petalite, spodumene, cordierite, aluminosilicates, mullite, or combinations thereof, etc., cordierite being preferred because of the generally lower coefficient of thermal expansion achievable, as shown in U.S. Pat. No. 3,954,672 to Somers et al. While such materials are generally considered to have a porous surface, it is generally advisable to provide a coating over the honeycomb structure, e.g., active alumina, to achieve a high surface area for distribution of the catalytically active component. These monolithic, substantially catalytically-inactive crystalline support members have been described in prior art patents, as for example in Keith et al U.S. Pat. No. 3,565,830, and the British Pat. No. 931,096 and its Japanese Pat. No. 292,558, such that it is not deemed necessary to describe them in detail herein.

Typically, and by way of example only, the catalytic component will comprise one or more of the noble and base metals and metal oxides of Groups IB, VB, VIB, VIIB and VIII of the Periodic Table, particularly copper, vanadium, chromium, manganese, iron, cobalt, nickel, platinum, palladium, rhodium and ruthenium, with a component being used singly or in combination with one or more of other active components.

While methods and apparatus are known in the art for coating a monolith support with a highly porous, fine grained, high surface area, refractory coating e.g., gamma alumina, the methods have either been such as to not lend themselves to mass production requirements or the apparatus has been costly and the process complex. The identified U.S. patent to Keith discloses the immersion of the monolith in the slurry with agitation to coat the passageways fully, followed by shaking and gentle blowing with air to remove excess coating slurry and open the plugged passageways. Such technique is both time consuming and uncertain in its results and blow-back of slurry is not uncommon. The U.S. Patent to Hoyer et al U.S. Pat. No. 4,039,482 discloses a method for coating whereby the monolith is encapsulated in a sealed chamber in which it is successively subjected to vacuum to de-gas the pores of the structure, followed by contact with a flowing stream of the coating slurry which flow is cut-off and, with the support submerged completely in the slurry in the chamber, pressure is applied to the slurry to force it into the support pores, this being followed by gravity draining and the application of air under pressure in the chamber to blow-down the excess slurry and unplug the passageways. A still further method for coating is disclosed in U.S. Pat. No. 3,873,350 to Dwyer et al comprising the steps of heating the support, immersing the support in the coating slurry, removing the coated support and draining excess slurry while shaking the support, and rotating the support about a substantially horizontal axis while blowing air through the passageways. U.S. Pat. No. 2,867,544 to Hall, Jr. discloses a method for coating the inner wall surface of or filling small diameter glass tubes wherein the tubes are first heated for obtaining adherence to and a continuous coating of the wall surface by the coating material, each tube being mounted between a pair of axially aligned holding members, the bottom members being connected to the coating material source, the top member being connected to a vacuum source which acts to draw the coating material up into the tube, the flow being interrupted by opening the bottom member to air.

SUMMARY OF THE INVENTION

In accordance with our method, a coating slurry of alumina is applied to a monolithic support having at least about 100 axially aligned tubular passageways to the square inch extending from one end of the support to the other and the support is then subjected to vacuum pressure to draw the slurry through the passageways and remove plugging and excess slurry, the coating being repeatable between succeeding supports.

It is thus an object of our invention to provide a coating method which utilizes subatmospheric pressure to purge the excess coating slurry from the surfaces of a monolith support having a large number of axially aligned tubular passageways while at the same time unplugging any blocked passageways in the support.

It is another object of our invention to apply purging subatmospheric pressure in at least two stages in order to increase the through-put and enable control of the coating operation to assure uniformity and reproducibility of the coating.

It is a further object of our invention to provide a vacuum fixture of relatively simple design having means for subjecting one end of the support to vacuum and the other end to air of at least atmospheric pressure.

BRIEF DESCRIPTION OF THE INVENTION

These and other objects of our invention will be apparent from the following description and the drawings in which FIG. 1 shows a cross-sectional-elevational view of a coating and/or purging station in a simplified system for coating monolith supports.

FIG. 3 shows a cross-sectional-elevational view of the coating and purging fixture of FIG. 2.

DETAILED DESCRIPTION OF THE INVENTION

Figure 1:
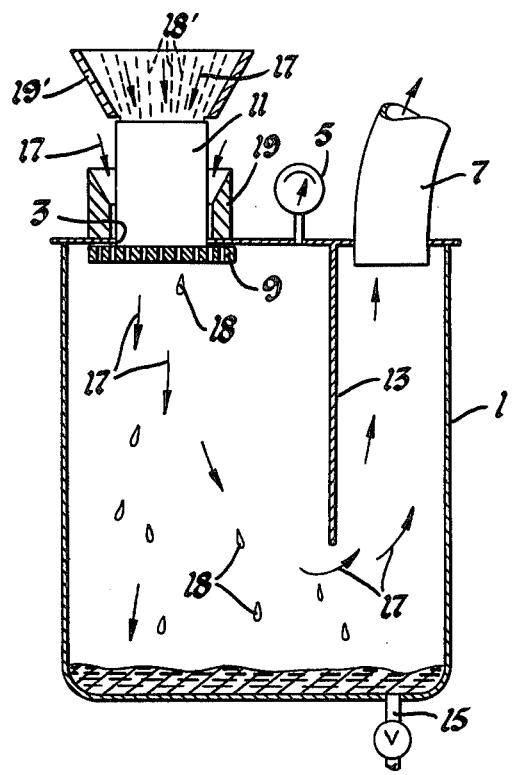

Referring to FIG. 1, there is shown a purge tank 1 having an inlet or opening 3 on its top surface, a vacuum gage 5 to indicate the level of subatmospheric pressure in the tank, and an outlet conduit 7 which is connected at a remote end, not shown, to a source of vacuum such as an exhaust pump or centrifugal blower having the capacity for maintaining a desired subatmospheric pressure level as described hereinafter in greater detail. A support or holder member 9 is provided at the inlet 3 to support in the opening 3 a ceramic monolithic support 11 having a plurality of passages extending from end-to-end thereof, the shape of the support being cylindrical, eliptical or of any other desired configuration. As shown, the member 9 is a perforated support, the monolith 11 being positioned on the member 9 on one of its ends so as to place the monolith passages in the fluid flow path through tank 1. It should be understood that the support or holder may take other forms such as a mechanical clamping holder or other suitable means for suspending the monolith 11 in the fluid flow path through the opening 3. Also provided within purge tank 1 is a baffle member 13 interposed between the inlet 3 and the outlet 7 in order to reverse the fluid flow path and separate any entrained coating slurry from the air being drawn into tank 1 through the monolith support 11. Separated slurry is collected in the bottom of tank 1 for recycling to the coating slurry supply through valved drain 15. Arrows 17 indicate the air stream pulled through the monolith support and the purge tank by the high capacity pump in the outlet conduit 7. Droplets 18 represent the coating slurry being drawn through the monolith for collection in the bottom of tank 1 on separation from the purging air stream 17. Flow lines 18' indicate the coating slurry being flowed over the monolith support 11 where coating and purging are to be accomplished in the same station, 19' indicating a slurry charge holder. It should be understood that coating may be accomplished in an earlier station by either dipping the support in the coating slurry or by flowing the slurry over the support surfaces in such earlier station. Also shown in FIG. 1 is a collar 19 adapted to be positioned around the inlet 3 and the monolith support therein. When used, the collar 19 is spaced apart from the surface of the support 11 to an extent allowing the air stream 17 to also flow over the outer surface and draw off excess coating slurry where the support has been dip coated.

In operating a system such as described, the monolith supports 11 would be loaded continuously on a conveyor mechanism which would move them through the various stations for coating, purging, drying and calcining for attaining a monolithic catalyst support having a repeatably uniform high surface area coating in the required amount for retention of the catalytically active material in the minimum amount for the required catalytic conversion.

In this regard it should be noted that a coating operation which does not produce coated supports with controlled amounts of coating, and therefore catalytically active material, between successive supports, requires the use of maximum amounts of coating and catalytically active material to assure that there will be sufficient activity with each support to carry on the desired conversion. Under such conditions many supports have more than the required amount of catalyst and coating.

The conveyor may be either of the generally linear type or of the rotating table type, this forming no part of our invention though we prefer the linear type for greater flexibility. Also, as would be obvious to those skilled in the art, the coating slurry may contain, in addition to the suspended high surface area solids such as gamma alumina, catalytically active materials, e.g., platinum and palladium, in the form of water soluble salts, e.g, chloroplatinic acid and palladium chloride. The amount of such materials required may be readily calculated on the basis of the amount of coating slurry made-up and the weight of high surface area material left on the monolith after purging, drying and calcining. Such codeposition of the high surface area material and the catalyst materials is preferred for simplicity and economy as well as control of processing.

As indicated, since the coating slurry is viscous, it tends to be retained in the passages of the monolith 11. The purge operation of our invention is intended to remove the excess slurry from the tubular passageways and leave a uniform coating of the high surface area alumina and catalyst material on the walls of the honeycomb structure. It is necessary that the purge operation provide a uniform coating the amount of which, for the same size monolith support with the same slurry, is substantially the same for each support passed through the coating and purging operations. Further, since various sizes of support may be passed through the system, the purging operation must be readily adjustable to achieve the desired coating. Monolith supports of the type herein discussed have at least about 100 axially aligned tubular passageways to the square inch.

We have found that a high volume, low vacuum pressure pump is necessary for the desired results to be achieved. More particularly, we have found that a centrifugal blower rated at 1500 SCFM at a static pressure of 16 inches of water is effective, with spare capacity for larger pieces, for accomplishing the desired purging on monolith supports of 5.6 inches diameter by 7 inches long having square longitudinal passageways measuring 0.065 inches on a side with a wall thickness of 0.010 inches, there being 178 passageways to the square inch.

In operation, the coating slurry is applied to the monolith, either by dip coating or by applying a coating charge to the upper end of the support, and the blower is started with the support positioned in the opening 3. The vacuum is effective in each unplugged passageway of the support to draw the slurry over the wall surfaces, the air flow serving to wipe excess slurry from the walls. Due to the high volume capacity of the blower, the remaining plugged cells are also subjected to the subatmospheric pressure in the tank 1 and the high volume capacity of the vacuum pump and are unplugged, excess slurry being collected in the bottom of the tank. The amount of slurry left on the monolith is controlled by the purge time and the vacuum pressure, at least about 30 seconds total time at a static pressure of from about 5 up to about 16 inches water being satisfactory. It is obvious that these factors may be readily selected and adjusted based on the equipment available, coating requirements, and the sizing of the monolith support, it being only necessary that the subatmospheric pressure level be sufficiently low and the volume capacity of the purge system sufficiently high to enable unplugging of passageways though even more than half of the tubular channels in the support are unplugged. We have also found it to be advantageous after the support has been purged from one end, to invert the support and continue the purge from the opposite end. This has been found to improve the uniformity of coating distribution on the passageway walls.

Figure 2:
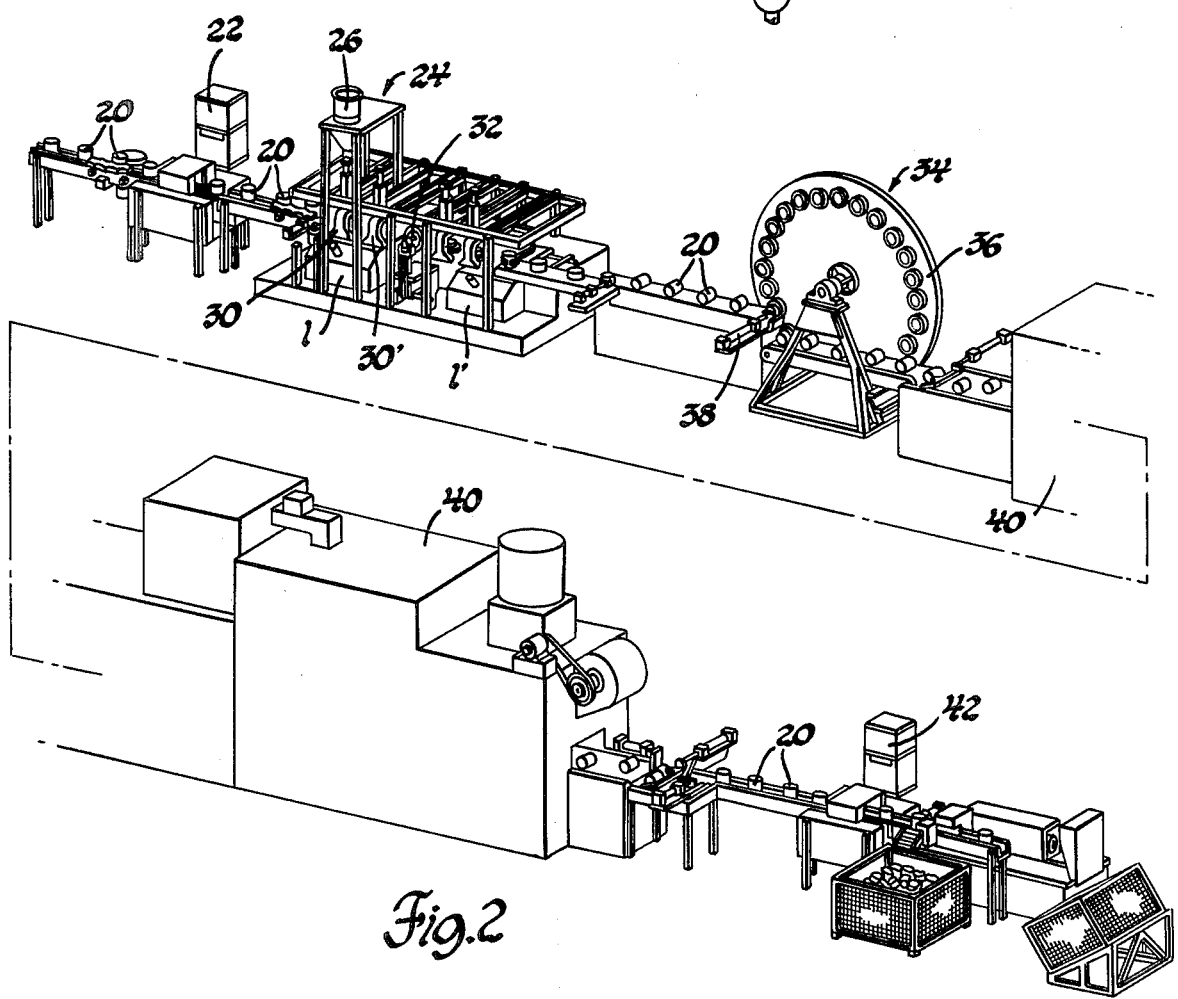
FIG. 2 shows a perspective view of a preferred system in which the coating slurry application and purging are accomplished in a plurality of coating-purging fixtures.

Having reference to FIG. 2, there is shown a perspective view of a production line of the preferred type for coating monolith supports in accordance with our invention. In this embodiment, the monolith supports 20 are shown being passed along a linear conveyor system through a series of stations to the point where the coated monolith support is packed in bins for either subsequent assembly in a catalytic converter or for impregnation with the catalytically active materials where co-impregnation with the high surface area alumina slurry was not accomplished.

More particularly, the monolith supports 20 from the extruding and calcining operations are loaded onto a conveyer for movement to a weigh station 22 where the initial weight of each support is taken and recorded for the purpose of coating control, each part being marked for identification. The support then moves to the coating and purging station 24 where the support is positioned, by any suitable means such as a movable clamp or calipers which comes in to grip the part and move it into the desired position, in vertical alignment between a charge tube connected to a slurry tank 26 above the top end of support 20 and the inlet 3 to the purge tank 1 below the bottom end of the support. The clamp holding the support then cooperates with a conduit connected to inlet 3 to enable the establishment of either a sealed or an open supporting connection between the conduit and the bottom end of the monolith support. Where a sealed connection is desired, it is established preferably about the outer peripheral surface or edge of the support 20 using a resilient sealing ring to minimize breaking stress. Alternatively, but not preferred, the seal may be established on the end surface of the support radially inward from but closely adjacent to the periphery, the outermost passageways being blocked. A preferred form of construction of such sealing mechanism is shown in FIG. 3 and is described in greater detail hereinafter. A similar sealing arrangement is provided at the top end of the monolith support with the feed tube from the slurry tank 26.

The coating and purging operation comprises releasing a measured amount, approximately one liter for the cylindrical parts previously described, of, preferably, catalyzed slurry from tank 26 into a tube having a sealed connection with the top end of the monolith support as previously described. The tank 26 is then closed off from the tube which is open to atmosphere at a point above the surface of the charge of coating slurry and the monolith support is subjected to the subatmospheric pressure in tank 1 by the opening of dampers or valves in the conduit 7, or at any other suitable position in the air flow stream, such as at the inlet 3. The vacuum pressure is then effective on the monolith to draw the slurry through the passageways of the support. As a preferred example, we have found that a total of at least about 30 seconds is sufficient time to remove the excess slurry and coat uniformly and repeatably the monoliths previously described when using a centrifugal blower giving a static pressure of about 6 inches of water as described.

It should be understood that the various actions into and within the coating and purging station 24 are timed and sequenced as desired. By way of example, it is preferred that the monolith support be subjected to the subatmospheric pressure in tank 1 a short time, less than about one second, prior to the release of slurry to the support in order that any leakage between the seal at the upper end of the support 20 be of air into the support passageways to prevent loss of slurry to the outer surface of the support. Also, the sequencing may be timed to break the seal at the upper end of the support 20 after drawing the coating slurry charge, this coating taking a period of about 5 seconds out of a total of 15 seconds in the preferred example given, through the tubular passageways, to supplement the air being drawn therethrough from the opening in the feed tube previously described.

Similarly, the through-put on the equipment may be increased by reducing the time the support 20 remains in the coating-purging fixture 30 and moving each support ahead to one or more additional purging fixtures 30' which are identical to the coating-purging fixture 30, including connection to a purge tank 1, except that the slurry tank 26 and connection thereto is omitted. As shown in FIG. 2, we prefer the multiple purge fixture system and show the use of a first purge fixture 30' connected to a first purge tank 1 together with the coating and purging fixture 30. A second pair of purge fixtures 30' are shown connected to a second purge tank 1'. Turnover means 32 is provided between the two pairs of fixtures to turn the monolith support end-for-end in order to achieve more uniform coating of the passageway surfaces. Such turnover fixture may be of any design well known in the art. In the arrangement described, the monolith support 20 is resident in each fixture for a period of 15 seconds, thus producing a coated support every 15 seconds.

The coated and purged monolith is then moved to a monolith support rotating machine 34 where the supports are rotated at a rate of about 4 RPM for a period of about 2 to 6 minutes, preferably about 4 minutes. This is an optional step in the processing of the monolith support but is preferred in our system since the rotation appears to prevent the slurry from sagging and improve distribution on the support. As shown, each part is automatically loaded into a rotatable holder on wheel 36 by a pusher device 38, similar mechanization being provided on the opposite side to unload the support from the wheel. Alternate rotating systems may be readily devised by those skilled in the art, e.g., a conveyer system in which each support is held on a rotatable spindle with sprocket at one end, separate chain means being used to rotate the sprocket and spindle, and such systems form no part of our invention. The support is then passed through a dryer-calciner oven 40 in which the free water in the support is first dried in a flowing stream of air at about 200° F. to an amount of about 0.5% by weight. We have found that drying may be conveniently accomplished in a dielectric oven over a period of about two minutes. The support is then calcined at a temperature of about 800° F. to remove combined water, this over a period of about 4 minutes. The removal of water prevents catalyst migration via water transport thus keeping the catalyst on the surface of the support. The part is then cooled and conveyed to a second scale 42 where it is weighed, recorded and coating weight determined for control purposes. After visual inspection for plugged passages and chips and the like, acceptable supports are packed for assembly in the catalytic converter or for impregnation with catalytically active material where co-impregnation in the slurry is not practiced. It should be understood that the viscosity of the coating slurry may be adjusted as necessary to achieve the desired coating, a viscosity of from about 60 to about 400 centipoises being used for the catalyzed slurry described herein, though viscosities as high as about 3,000 centipoises may be used as described in assignee's copending application Ser. No. 783,188 in the name of A. V. Somers, now abandoned the coating slurry being compounded as described in Ser. No. 783,188. In measuring viscosity, a #2 spindle was used at 60 rpm using an L.V.T. viscosimeter. Typical properties of catalyzed platinum-palladium-alumina slurry are

| Range | | Preferred | |
|---|---|---|---|
| about 3.6–4.7 | pH | - about 4 | |
| 30–45 | % solids | - about 37 | |
| 60–3,000 | viscosity cps. | - about 400 | |
| at least 100 | surface area $m^2/g$ | - about 190 | |
| ratio of Pt:Pd = 5:2; weight as desired for performance | % platinum - % palladium- | about 0.9 of dry solids about 0.36 of dry solids | about 25 grams $ft^3$ |

In Table I there is shown the results of tests coating a large number of the above described monolith supports to determine the effectiveness of our method for flow coating monoliths of the kind described hereinbefore. In this series the flow coating with vacuum was started before the slurry charge was loaded at the top of the support.

TABLE I

Monolith Coating Test (Flow Coat)

| Slurry Charge cc | Static Pressure inches $H_2O$/time | Support, Dry Wt. - gms. | Coating, Dry Wt. - gms. | Coating Pick-up % |
|---|---|---|---|---|
| 500 | 5.9/30/30 | 921.4 | 98.4 | 10.7 |
| 500 | 6.0/25/25 | 915.1 | 107.5 | 11.7 |
| 500 | 5.9/25/25 | 906.6 | 108.4 | 12.0 |
| 500 | 6.1/25/25 | 916.2 | 105.9 | 11.6 |
| 500 | 5.9/25/25 | 925.3 | 101.7 | 11.0 |
| 500 | 5.8/25/25 | 889.5 | 110.5 | 12.4 |
| 500 | 5.9/25/25 | 938.5 | 100.7 | 10.7 |
| 500 | 5.5/30/30 | 929.2 | 92.6 | 10.0 |
| 500 | 5.9/30/30 | 910.3 | 108.2 | 11.9 |
| 500 | 6.0/30/30 | 932.5 | 95.5 | 10.2 |
| 500 | 6.1/30/30 | 927.1 | 99.2 | 10.7 |
| 500 | 6.1/30/30 | 925.0 | 107.0 | 11.6 |
| 500 | 6.0/30/30 | 919.1 | 95.8 | 10.4 |
| 500 | 6.5/25/25 | 915.3 | 107.9 | 11.8 |
| 500 | 6.7/25/25 | 914.2 | 105.6 | 11.6 |
| 500 | 6.8/25/25 | 916.9 | 104.8 | 11.4 |
| 500 | 6.8/25/25 | 914.5 | 106.3 | 11.6 |
| 500 | 6.9/25/25 | 929.8 | 99.4 | 10.7 |
| 500 | 6.8/25/25 | 904.2 | 103.7 | 11.5 |
| Average | | | 103.1 gms. | 11.2% |

In conducting these tests, a slurry charge of 500 cc was applied at the upper end of the support and a static pressure of from 5.5 to 6.9 inches of water was drawn on the purge tank, each support being subjected to this vacuum pressure for a period of 25 or 30 seconds on each end, i.e., after being subjected to the vacuum for a period of time indicated, the support is reversed to place the upper end at the lower end position. In this manner we find we achieve a more uniform coating than when drawing the vacuum from one end only. The slurry is drawn through the monolith support passageways during the first 5 seconds, approximately, and the remaining time is used to purge the excess slurry from their surfaces and to unplug those passageways which are blocked by slurry.

As can be seen from the data, about 84% of the pieces coated had the average coating weight of 103.1 grams ±5%, the remaining pieces being within a 10% limit. Control of this character enables the use of a lower over-all loading with the high surface area alumina and catalytically active materials while still being assured of sufficient catalytic materials to achieve the desired level of activity and life for each monolith support coated.

Table II shows the results of tests coating a large number of the above-described monolith supports using dip coating for applying coating slurry to the monolith surfaces. As indicated, after dipping the monolith in the coating slurry and keeping it submerged therein for 30 seconds, the supports were removed and cleared of excess slurry by draining and application of blow-off air stream over the support for a period varying from 4 to 39 seconds. The parts were then subjected to vacuum pressure to purge excess slurry from and clear plugged passageways in the support. As noted, the supports were subjected to purge vacuum of 9.5 inches of water for a period of 30 seconds from each end. The average coating weight is 99.4 and all parts but two are within ±5% of the average.

TABLE II

Monolith Dip Coating Test

| | Support, Dry Wt. g. | Blow-off time-sec. | Coating Dry Wt. g. | Coating Pick-up % |
|---|---|---|---|---|
| 1 | 943.0 | 18 | 101.3 | 10.7 |
| 2 | 930.8 | 39 | 96.0 | 10.3 |
| 3 | 936.4 | 24 | 101.9 | 10.9 |
| 4 | 934.6 | 34 | 97.5 | 10.4 |
| 5 | 944.0 | 29 | 101.6 | 10.8 |
| 6 | 944.4 | 36 | 99.1 | 10.5 |
| 7 | 944.9 | 28 | 99.8 | 10.6 |
| 8 | 946.0 | 31 | 100.3 | 10.6 |
| 9 | 943.6 | 28 | 97.8 | 10.4 |
| 10 | 949.1 | 29 | 100.0 | 10.5 |
| 11 | 941.9 | 27 | 95.6 | 10.1 |
| 12 | 941.8 | 24 | 99.3 | 10.5 |
| 13 | 932.1 | 21 | 100.8 | 10.8 |
| 14 | 928.2 | 21 | 98.6 | 10.6 |
| 15 | 938.0 | 20 | 100.8 | 10.7 |
| 16 | 941.7 | 19 | 97.9 | 10.4 |
| 17 | 944.1 | 16 | 98.0 | 10.4 |
| 18 | 934.0 | 16 | 101.8 | 10.9 |
| 19 | 945.4 | 18 | 96.1 | 10.2 |
| 20 | 945.1 | 14 | 98.5 | 10.4 |
| 21 | 944.7 | 12 | 96.5 | 10.2 |
| 22 | 929.0 | 14 | 99.8 | 10.7 |
| 23 | 935.1 | 9 | 100.0 | 10.7 |
| 24 | 943.5 | 6 | 96.5 | 10.2 |
| 25 | 949.4 | 4 | 100.6 | 10.6 |
| 26 | 940.7 | 7 | 94.9 | 10.1 |
| 27 | 944.1 | 5 | 87.1 | 9.2 |
| 28 | 927.8 | 6 | 122.1 | 13.1 |
| 29 | 942.8 | 5 | 103.1 | 11.0 |
| 30 | 950.1 | 10 | 100.0 | 10.6 |
| Average | | | 99.4 gms. | 10.6% |

As shown in FIG. 3, a suitable coating and purging fixture comprises a pair of tubular connecting members 50 and 52 adapted to be brought in contact with the lower and upper ends of the monolith support when the support is brought within the treating station for coating and purging. The lower end 51 of lower connecting member 50 has an interconnection with the vacuum purge tank 1, shown as being telescopically sleeved within the inlet 3. Other interconnections such as described for member 52 may also be used. The upper end 53 of upper connecting member 52 has a sealed interconnection through a bellows member 54 with a slurry metering member 56 connected to the slurry feed tank 26. As shown with respect to lower connecting member 50, the various interconnections may be made by telescoping pieces. Open type interconnections may be used in practicing the method of our invention since the vacuum purge system has sufficient capacity to clear plugged passageways in the monolith support even though such passageways decrease and open passageways increase during the purge period of treatment. As shown in FIG. 3, the wall of upper connecting member 52 has a plurality of vents 58 to assure availability of sufficient air at least of atmospheric pressure to accomplish the purging action through the monolith. The vents 58 are positioned above the level of the coating slurry charge metered into connecting member 52, the vents serving to permit the vacuum to draw the slurry through the support. It is to be noted that in lieu of vents to atomsphere, the venting may be accomplished by recirculating the moist air from the outlet side of the vacuum pump, pressure of recirculated air being controlled by suitable means forming no part of our invention.

The ends of connecting members 50 and 52 spaced from their corresponding ends 51 and 53 are similarly designed to enable the members to form a sealed connection with the upper end of the monolith support and an unsealed connection with the lower end of the support. More particularly, each connecting member is provided with an annular plastic sealing ring 60 formed of a plastic material such as rigid polyurethane having resilience without being so soft as to fold down and block outer passageways of the support when the seal is established in the manner hereinafter described. A durometer reading of 70 has been found acceptable with the polyurethane seals described. The inner peripheral wall surface of the ring 60 is formed with a conical face 61 opening outwardly from the center thereof so as to enable convenient sealing of monolith supports of varying diameters. As shown, the sealing rings 60 are retained on the ends of the connecting members 50 and 52 by clamp rings 63 which are secured to the connecting members by screws 64 spaced around the clamp rings. To achieve the unsealed connection with the lower end of the monolith support, a plurality of support tabs 66 are provided on the sealing rings 60 so as to project radially inward to serve as supports for the end of the monolith support 20. These support tabs are preferably thinner than the width of a passageway to prevent blocking and may be formed as an integral part of the ring 60 or may be formed of stainless steel and inserted into receiving slots formed in the ring 60. Stainless steel support tabs are preferred to reduce the cost of manufacture of the rings 60. Also, stainless steel is used to avoid interaction between the noble metal catalysts in the slurry and other metals which are lower in the Electromotive Series of Metals. It is here to be noted that this concern for interaction requires that the materials used in the coating and purging stations be either made of non-reacting materials such as teflon and polyurethane, or that metal surfaces be coated with such materials to prevent interaction. It should also be noted that the sealing ring 60 on the lower connecting member 50 is provided with a radially extending drain groove 68 which cooperates with an annular drip pan 70 clamped between the end of member 50 and sealing ring 60. Drip pan 70 serves to collect any dripping coating slurry from the slurry tank 26 and from the described structural members positioned above the monolith support being treated.

As noted above, in our preferred design of the coating and purging fixture 30, a slurry metering member 56 provides a measured amount of slurry for application to the upper end of the monolith support held in sealed contact with the conical face 61 of the sealing ring 60 on upper connecting member 52. As shown in FIG. 3, the metering is accomplished by providing a pair of spaced apart butterfly valves 57 and 57', the space between the valve centers forming the metered volume of slurry. In operation, valve 57' is shut while valve 57 is opened to fill the valve block with slurry. Upon closing valve 57 the metering member is prepared for actuation upon positioning a monolith support between connecting members 50 and 52. When so positioned, the valve 57' is opened and the measured volume of slurry is applied to the upper end of the support 20 and coating and purging vacuum is applied, all in timed sequence as desired and by means well known in the art. Alternative metering members may be used as is well known, i.e., a single timed valve may be operated to secure the desired slurry charge.

In our preferred embodiment, the monolith support 20 is positioned in the coating and purging fixture 30, in axial alignment between connecting members 50 and 52 which are actuated to contact the ends of the support 20. As noted, in our preferred embodiment this establishes a sealed connection with the upper end of the support 20 and an open connection with the lower end of the support. It should be understood that the bottom end of the support 20 may also have a sealed connection with its sealing ring 60 or the top of the support 20 may have an open connection as described. This latter open connection is not preferred since coating slurry may then leak around onto the outer surface of the support 20, it being possible to minimize such leakage by drawing the vacuum through the monolith just prior to applying the slurry charge to the monolith.

While alternative mechanizations are possible within the skill of the art, we prefer to use a pair of clamping arms or grips to pick-up the monolith support 20 from the moving belt by clamping the support between its ends, the support being rotated into position between connecting members 50 and 52 and there held by the arms. At least one of the connecting members is then activated by any suitable means such as a linear or caliper type actuator to establish contact between the connecting members and the ends of the support 20 as described. FIG. 3 shows a fluid actuated piston-cylinder actuator 74 for establishing contact. It should be understood that the timing and actuating mechanisms form no part of our invention and may be selected as desired by those skilled in the art.

As described, about the first 5 seconds of the vacuum treatment serves to draw the coating slurry through the support, the remaining period, about 10 seconds, serving to draw down excess slurry from the open passageway surfaces and to start unplugging blocked passageways. As described and as shown in FIG. 3, the support 20 is then picked up by a second pair of clamping arms 72 and is positioned in a purge fixture 30' which is identical with the first fixture 30 except for the omission of the bellows 54, the metering member 56, and the slurry feed tank 26. The vacuum purge treatment is repeated in this fixture 30' for a period of 15 seconds. The support is then again picked-up as before and rotated end-for-end and positioned in a second purge fixture 30' for addition vacuum treatment and this may be repeated with vacuum applied at the same rotated end. As noted above, the use of multiple treating fixtures enables a higher through put on the same production line.

Our invention in providing a simplified method and means for achieving repeatable controlled coating of the many small size passageways in a monolith support has been described in the foregoing specification and drawings. Additional advantages of our system to those described hereinbefore will be apparent to those skilled in the art, such advantages including the economy and reliability resulting from use of coating and purging stations which are open to atmosphere and unencapsulated rather than using sealed chambers, and the fact that applicants vacuum system contains the coating slurry for ready reuse as opposed to a blow-off system which scatters the slurry. Alternative and equilavent steps and structure will occur to those skilled in the art and, to the extent covered by the attached claims are intended to be within the scope of our invention.

We claim:

1. A method for coating with alumina porous ceramic monolith catalyst supports having at least about 100 axially aligned tubular passageways to the square inch extending from one end of the support to the other so as to produce repeatable results on a production basis and utilizing vacuum pressure to continuously draw air through the passageways to cause the coating slurry to flow over the porous ceramic wall surfaces of the tubular passageways of the monolith support, comprising the steps of applying the coating slurry containing high surface area alumina in suspension to the support, subjecting one end of the support to a vacuum to draw the slurry through and form an alumina coating on the passageways, continuing the application of vacuum pressure to unplug blocked passageways and to form a uniform coating and purge excess coating slurry by the continuing drawing of air through the open passageways, drying the support, and calcining the support to fix the alumina coating on the passageway surfaces, the vacuum static pressure on the support being from about 5 up to about 16 inches water and being applied for a total period of at least about 30 seconds to achieve the desired coating and to remove plugging and excess slurry from the passageways even though the number of open passageways continually increases during the period of vacuum treatment.

2. A method as in claim 1 wherein the coating slurry is applied by dipping the support in the coating slurry.

3. A method as in claim 1 wherein the coating slurry is applied by positioning the coating slurry on the upper end of the support, the lower end of the support being subjected to vacuum.

4. A method for controlling the coating with alumina of porous ceramic monolith catalyst supports having at least about 100 axially aligned passageways to the square inch extending from one end of the support to the other to achieve repeatable results on a production basis and utilizing vacuum pressure to form a uniform coating by the continuous drawing of air through the passageways to distribute the coating slurry over the surfaces of and unplug blocked tubular passageways of the monolith support, comprising the steps of positioning said support between a pair of connecting members with one member in contact with the upper end of said support and the other member in contact with the lower end of said support, the outer surface of said support being unencapsulated and open to atmosphere, feeding said coating slurry to the connecting member at the upper end of said support, subjecting the lower end of said support to a vacuum to draw the slurry through the passageways, continuing the application of vacuum to unplug blocked passageways and to form a uniform coating and purge excess coating slurry by the continuing drawing of air through the open passageways, removing the vacuum from said support, drying the support, and calcining the support, the vacuum static pressure on the support being from about 5 up to about 16 inches water and being applied for a total period of at least about 30 seconds to achieve the desired coating and remove excess slurry from the open passageways and to unplug blocked passageways despite the increasing number of open passageways during the period of vacuum treatment.

5. A method for coating with alumina porous ceramic monolith catalyst supports having at least about 100 axially aligned passageways to the square inch extending from end to end thereof to achieve repeatable results on a production basis and utilizing vacuum pressure to distribute the coating slurry over the surfaces of and unplug blocked tubular passageways of the monolith support, comprising the steps of positioning said support between a pair of connecting members with one member in contact with the upper end of said support and the other member in contact with the lower end of said support, feeding said coating slurry to the connecting member at the upper end of said support, subjecting the lower end of said support to a vacuum to draw the slurry through the passageways, continuing the application of vacuum to unplug blocked passageways, removing the vacuum from said support, drying the support, and calcining the support, the vacuum static pressure at the lower end of said support being from about 5 up to about 16 inches water and such pressure is applied for a total period of at least about 30 seconds for coating the passageway surfaces, to remove excess slurry from the open passageways and to unplug blocked passageways despite the increasing number of open passageways during the period of vacuum treatment, vacuum being applied first at one end of said support followed by reversal by said support end-for-end with vacuum applied at the other end.

* * * * *